(12) United States Patent
Lo (10) Patent No.: US 12,058,788 B2
(45) Date of Patent: Aug. 6, 2024

(54) AC LED CIRCUIT WITH STANDARD DIMMER COMPATIBILITY

(71) Applicant: AMPCO PRODUCTS LTD., Hong Kong (HK)

(72) Inventor: Chun Tung Lo, Hong Kong (HK)

(73) Assignee: Good Earth Lighting, Inc., Mount Prospect, IL (US)

( * ) Notice: Subject to any disclaimer, the term of this patent is extended or adjusted under 35 U.S.C. 154(b) by 0 days.

(21) Appl. No.: 17/420,883

(22) PCT Filed: Jan. 7, 2019

(86) PCT No.: PCT/CN2019/070586
§ 371 (c)(1),
(2) Date: Jul. 6, 2021

(87) PCT Pub. No.: WO2020/142866
PCT Pub. Date: Jul. 16, 2020

(65) Prior Publication Data
US 2022/0095426 A1    Mar. 24, 2022

(51) Int. Cl.
*H05B 45/20*    (2020.01)
*H05B 45/10*    (2020.01)

(52) U.S. Cl.
CPC ............. *H05B 45/20* (2020.01); *H05B 45/10* (2020.01)

(58) Field of Classification Search
CPC ................................ H05B 45/20; H05B 45/10
See application file for complete search history.

(56) References Cited

U.S. PATENT DOCUMENTS

| 9,420,644 B1* | 8/2016 | Shum | F21V 29/763 |
| 10,159,131 B1* | 12/2018 | Chaimberg | H05B 45/46 |
| 10,334,682 B1* | 6/2019 | Hsu | H05B 45/10 |

(Continued)

FOREIGN PATENT DOCUMENTS

| CN | 103582231 A | 2/2014 |
| CN | 107995750 A | 5/2018 |
| TW | 201717701 A | 5/2017 |

OTHER PUBLICATIONS

CNIPA—International Search Report from related International Application No. PCT/CN2019/070586 (Sep. 29, 2019), 4 pgs.

(Continued)

*Primary Examiner* — Minh D A
(74) *Attorney, Agent, or Firm* — McDermott Will & Emery LLP (57) ABSTRACT

A lighting system and a circuit for a solid state lighting apparatus are provided. The circuit includes an AC power source, an AC TRIAC dimmer, a plurality of light emitting diodes (LEDs), a bridge rectifier for providing a rectified AC waveform, and at least one capacitor for reducing flicker in the LEDs, and a plurality of LEDs with lower forward voltage connected to a static dimming bleeder or bleeder circuit for providing holding current to the triac of a dimmer circuit to increase the overall efficiency of the lighting system without dynamic control of the bleeder circuit. In some embodiments, the circuit includes a plurality of current sinks used for setting and maintaining a current to the main LEDs and to establish a stable bleeder current.

6 Claims, 6 Drawing Sheets

(56) References Cited

U.S. PATENT DOCUMENTS

| | | | |
|---|---|---|---|
| 2012/0081009 A1* | 4/2012 | Shteynberg | H05B 45/20 |
| | | | 315/122 |
| 2015/0312987 A1* | 10/2015 | Gibbs | H05B 45/345 |
| | | | 315/122 |
| 2017/0142798 A1* | 5/2017 | Chiu | H05B 45/48 |
| 2017/0231040 A1* | 8/2017 | Ido | H02M 7/06 |
| 2017/0238377 A1 | 8/2017 | Miskin | |
| 2017/0265274 A1 | 9/2017 | Hirth | |
| 2018/0014369 A1* | 1/2018 | Kim | H05B 45/10 |

OTHER PUBLICATIONS

CNIPA—Written Opinion from related International Application No. PCT/CN2019/070586 (Sep. 29, 2019), 3 pgs.

\* cited by examiner

AC LED CIRCUIT WITH STANDARD DIMMER COMPATIBILITY

CROSS-REFERENCES TO RELATED APPLICATIONS

This application is the U.S. National Phase under 35 U.S.C. § 371 of International Patent Application No. PCT/CN2019/070586, filed on Jan. 7, 2019, the entire disclosure of which Application is incorporated by reference herein.

FIELD

The present disclosure generally relates to a lighting system for alternative circuit (AC) driven light emitting diode apparatus and methods to provide efficient lighting.

BACKGROUND

Solid state lighting arrays are used for a number of lighting applications. For example, solid state lighting panels including arrays of solid state light emitting devices have been used as direct illumination sources. A solid state light emitting device may include, for example, a packaged light emitting device including one or more light emitting diodes (LEDs). LEDs based on inorganic active materials typically include semiconductor layers forming p-n junctions. LEDs based on organic active materials (OLEDs), which include one or more organic light emission layers, are another type of solid state light emitting device. Typically, a solid state light emitting device generates light through the recombination of electronic carriers, i.e., electrons and holes, in a light emitting layer or region.

Although solid state light sources having high efficiency have been demonstrated, one problem with the large-scale adoption of such light sources is that solid state lighting devices are typically designed to be driven using direct current (DC) power, while electric power (i.e. from power grid) is distributed using alternating current (AC), which is more efficient for long distance power distribution. Typically, a solid state lighting source is provided or coupled with a power converter that converts AC power into DC power, and the DC power is used to energize the light source.

The use of such power converters increases the cost of the lighting source and/or the overall installation, and introduces additional efficiency losses. Furthermore, these power converters prohibit the use of traditional AC-lighting dimmer solutions for adjusting the brightness of LED lighting sources.

Some attempts at providing AC-driven solid state lighting sources have involved driving an LED or string or group of LEDs using a rectified AC waveform. However, because the LEDs require a minimum forward voltage to turn on, the LEDs may turn on for only a part of the rectified AC waveform, which may result in visible flickering, may undesirably lower the power factor of the system, and/or may increase losses in the system.

Other attempts at providing AC-driven solid state lighting sources have involved placing LEDs in an anti-parallel configuration, so that half of the LEDs are driven on each half cycle of an AC waveform. However, this approach requires twice as many LEDs to produce the same luminous flux as using a rectified AC signal increasing the size, cost, and complexity of the system.

SUMMARY

A lighting system for solid state lighting apparatus is described herein. According to some embodiments, the lighting system includes a first plurality of light emitting diodes (LEDs), a circuit for receiving an AC waveform from a TRIAC dimmer and generating a rectified AC waveform. The circuit includes one or more current sinks, a bridge rectifier connected to the one or more current sinks, a bleeder circuit, and a second plurality of LEDs connected to the bleeder circuit. In some embodiments, the bleeder circuit maintains a load on the TRIAC dimmer when an output voltage from the bridge rectifier drops below a voltage to turn on one or more of the first plurality of LEDs. In some embodiments, the load comprises the second plurality of LEDs.

In some embodiments, the circuit further includes one or more capacitors for reducing flickering of one or more of the first plurality of LEDs. In some embodiments, one or more of the first plurality of LEDs have a color temperature different than one or more of the second plurality of LEDs. In some embodiments, one or more of the first plurality of LEDs is turned off and one or more of the second plurality of LEDs is turned on to provide a first color temperature corresponding substantially to a color temperature of the one or more of the second plurality of LEDs. In some embodiments, one or more of the first plurality of LEDs and one or more of the second plurality of LEDs are turned on to provide a second color temperature corresponding substantially to a color temperature of the one or more of the first plurality of LEDs. In some embodiments, the circuit further includes one or more capacitors for reducing flickering of one or more of the second plurality of LEDs. In some embodiments, the one or more current sinks include an integrated circuit for setting a stable current. In some embodiments, the AC waveform input voltage may be between 0 V and 277 V.

A circuit for solid state lighting apparatus is described herein. According to some embodiments, the circuit for solid state lighting apparatus includes an AC power source, a first plurality of light emitting diodes (LEDs), a bridge rectifier for providing a rectified AC waveform, and at least one capacitor for reducing flickering in the LEDs. In some embodiments, the circuit further includes a dimming bleeder, and a second plurality of LEDs connected in series to the dimming bleeder. In some embodiments, the first plurality of LEDs have a first color temperature and the second plurality of LEDs have a second color temperature that is different from the first color temperature. In some embodiments, the first plurality LEDs have a first color and the second plurality of LEDs have a second color that is different from the first color. In some embodiments, the first plurality of LEDs are turned off and the second plurality of LEDs are turned on to provide a color temperature substantially similar to the second color temperature. In some embodiments, the first plurality of LEDs and the second plurality of LEDs are turned on to provide a color temperature substantially similar to the first color temperature.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosures. These embodiments are for illustrative purposes only and are not to scale, instead emphasizing the principles of the disclosure. These drawings include the following figures, in which like numerals indicate like parts.

DETAILED DESCRIPTION

The present disclosure is directed, in part, to a lighting system for alternating current (AC) driven light emitting diode apparatus and methods to provide efficient lighting. The present disclosure is also directed, in part, to a lighting system for AC driven light emitting diode apparatus with a circuit for reduced flickering in a first set of lighting devices and with an optional second set of lighting devices for low-voltage lighting. The circuit as described herein is compatible with a two terminal dimmer which includes a three-terminal semiconductor device (TRIAC) for controlling an alternating current, commonly referred to as a wall dimmer or a TRIAC dimmer. The present disclosure is also directed to using the first set and second set of lighting devices for changing the color temperature and/or brightness of the lighting system. The disclosure is also directed to a lighting system with improved system efficiency utilizing a bleeder circuit which uses bleeder current to produce light.

Embodiments of the present disclosure now will be described more fully hereinafter with reference to the accompanying drawings, in which embodiments of the disclosure are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The circuit as disclosed herein is designed to drive a load consisting of a solid state lighting device, such as, an LED or a set of LEDs without the use of a direct current (DC) driver. Instead of a DC driver, the circuit rectifies and smooths out an AC input to drive the set of LEDs. As the voltage in the AC waveform oscillates, the voltage level at times will be above the forward (turn-on) voltage of the plurality of LEDs, for example, from 12V to 160V and back down to 12V, in which case the LED(s) will be in an on state. Alternately, there will be instances when the AC voltage waveform drops below the forward (turn-on) voltage of the plurality of LEDs, for example, below 12V, in which case the LED(s) will be in an off state. Capacitance in parallel with the LED(s) helps supply current to the LED(s) while the AC waveform is below the forward voltage of the plurality of LED(s). This feature, combined with the short time period the AC waveform is below the forward (turn-on) voltage of the plurality of LED(s), ensures that any diminished illumination from LED(s) is for a duration brief enough that it is not noticeable to some human eyes.

In some preferred embodiments, the circuit incorporates a dimming bleeder, which keeps a standard (wall) dimmer active by providing holding current to the semiconductor (TRIAC) element of the dimmer circuit. The TRIAC is a three terminal semiconductor device within a typical wall dimmer device (herein referred to as a TRIAC dimmer), that conducts current in either direction of the AC, and when triggered at a controlled phase angle of the AC in the circuit, allows control of the average current flowing into the load. When the current drops below a certain threshold through the TRIAC (i.e., the current drops below a "holding current" level), current cannot flow unless the TRIAC is re-triggered. The dimming bleeder may be used to maintain a load on the TRIAC dimmer (i.e., maintain a certain holding current) when the voltage of the AC source is below the forward (turn-on) voltage threshold of the LED(s). In some designs, the dimming bleeder is in a static mode, which means the bleeder is continuously applied to the input, meaning that when a lighting device is connected to the AC source through a TRIAC dimmer, a holding current is continuously pulled through the TRIAC dimmer, regardless of the voltage being supplied by the AC source. In some embodiments, the static dimming bleeder includes a set of resistors and a second set of LEDs that activate (e.g., turn-on) at a lower forward (turn-on) voltage than the first (or the main) set of LEDs. The second set of LED(s), thus, utilizes the static bleeder energy to both generate light at the lower voltage segments of the AC input waveform and add additional light during the higher levels of voltage of the AC waveform. This functionality improves the efficiency of the lighting system and, at the same time, applies a holding current to the TRIAC dimmer.

As used herein, although the term LED is generally used to describe the light emitting device (usually a diode) or set of light emitting devices (diodes) throughout the specification. Organic LEDs (OLEDs) can be used in place of the LEDs albeit with different voltage and current configurations. As used herein, the terms "main," "primary" or "first set" are used to describe the LEDs in the lighting system that generate the majority of the light for illumination. The main, primary, or first set of LEDs typically have a forward (turn-on) voltage below the peak voltage of the AC input. As used herein, the terms "secondary," "bleeder" or "second set" are used to describe LEDs that have a forward (turn-on) voltage below the forward (turn-on) voltage of the first set of LEDs in the circuit of a lighting system. The secondary, bleeder or second set of LEDs are used as a dimming bleeder (also referred to herein as a bleeder circuit) to provide a holding current for the TRIAC and to generate additional or secondary light, thus increasing the efficiency of the overall lighting system.

Figure 1:
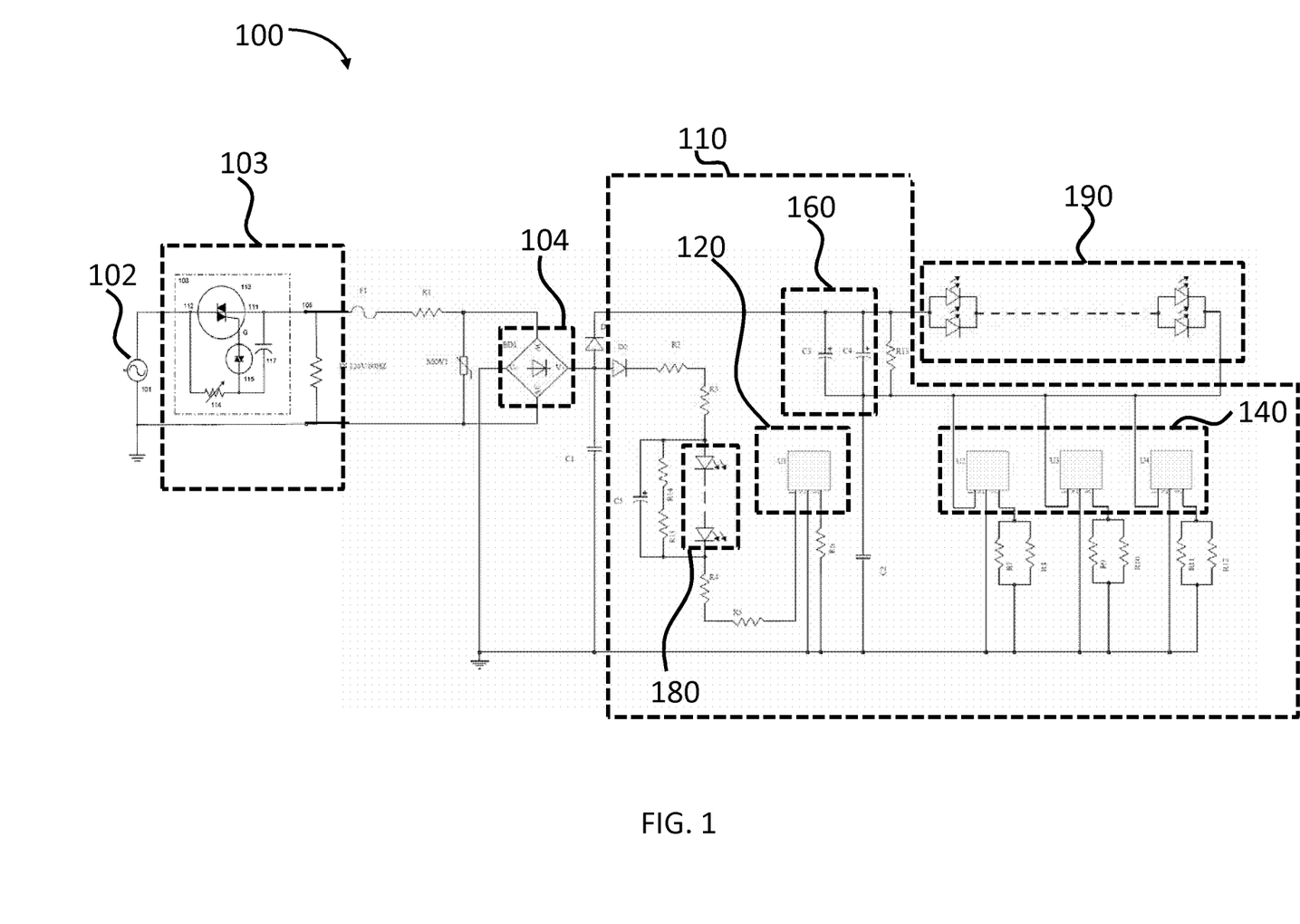
FIG. 1 is a schematic circuit diagram of a lighting system with a circuit for reduced flickering and a series of light emitting devices for low-voltage lighting in accordance with some embodiments of the invention.
Figure 2:
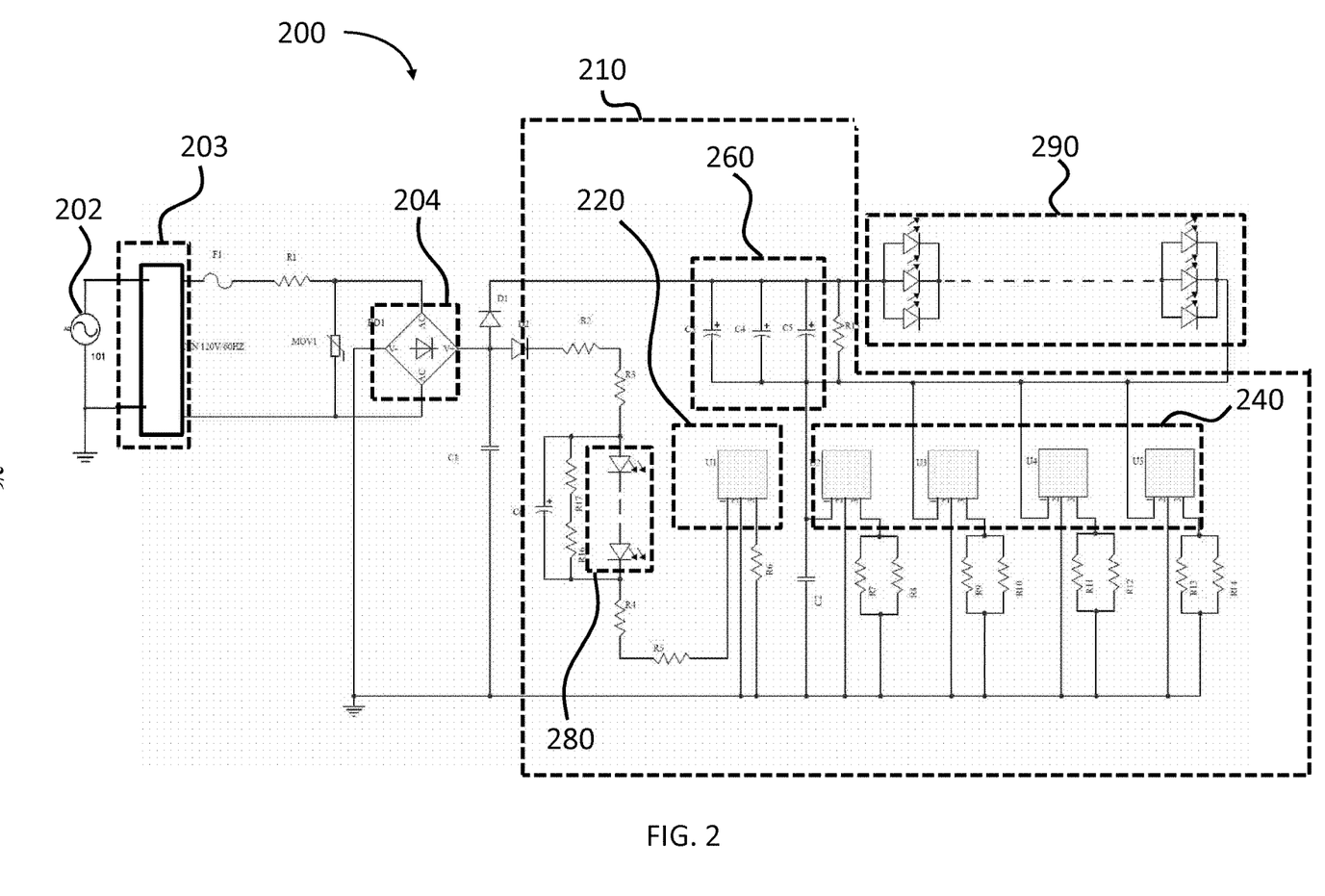
FIG. 2 is a schematic circuit diagram of a lighting system similar to that of FIG. 1, with a higher lumen in accordance with some embodiments of the invention.
Figure 3:
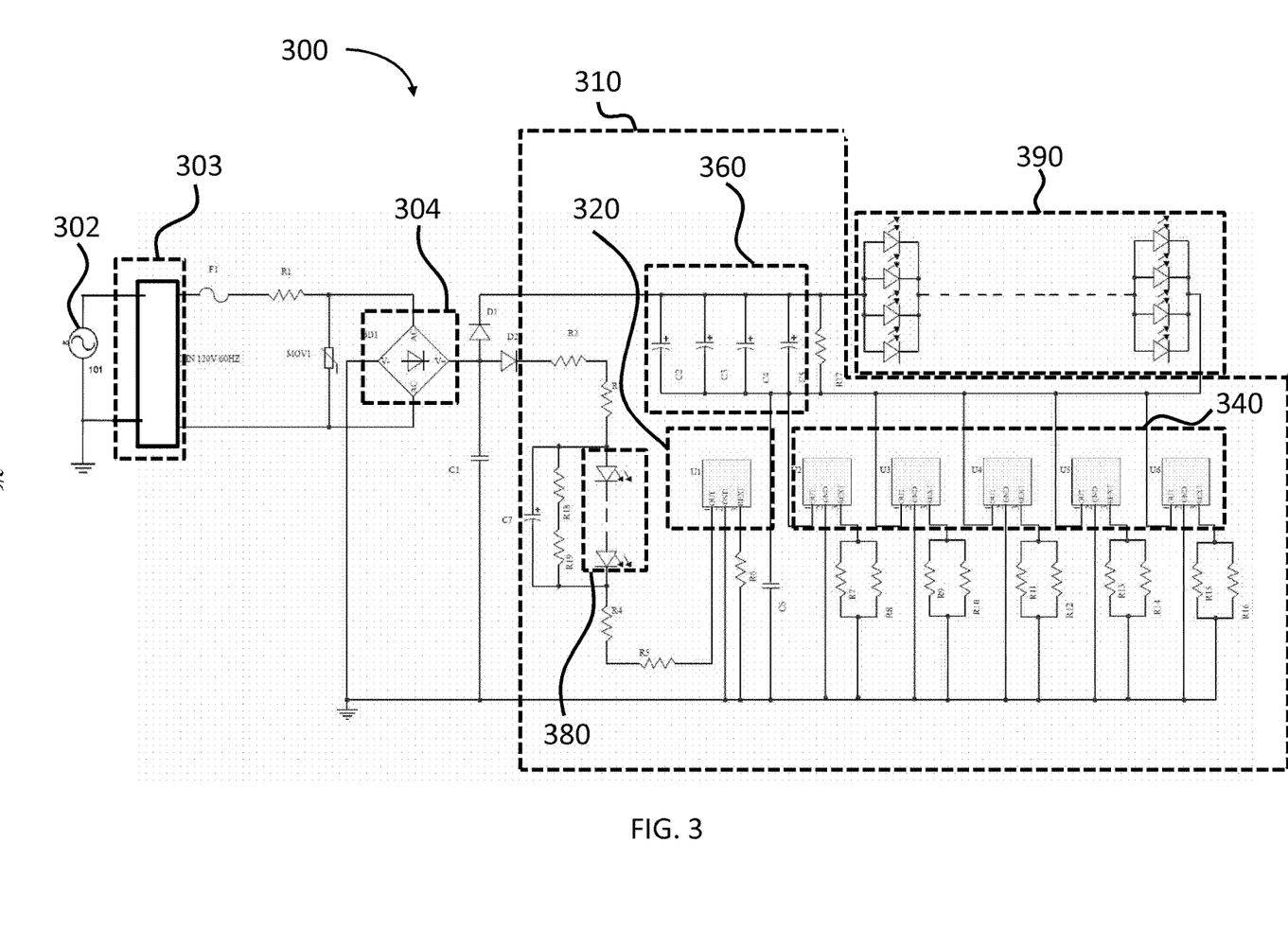
FIG. 3 is a schematic circuit diagram of a lighting system similar to that of FIG. 1, with a much higher lumen in accordance with some embodiments of the invention.

FIGS. 1-3 show example circuit diagrams that include a static dimming bleeder circuit which include a second set of LEDs to recover some of the "wasted" bleeder current to generate light. This embodiment is used to overcome the drop in efficiency which would accompany eliminating the dynamic control utilized by other methods for implementing holding current or bleeder current with TRIAC dimmers. The static dimming bleeder with the second set of LEDs is used to maintain a load on the TRIAC dimmer when the voltage of the AC source is below the turn-on voltage threshold of the first set (main) of LEDs, regardless as to the conduction angle of the AC waveform. The main operation of the circuit includes using the second set of LEDs in the bleeder current path to generate light while changing the bleeder from dynamic to static, eliminating the need for the bleeder current to be controlled (dynamically) by the main LED current sensing circuit. The fact that the bleeder current is drawn from the AC source during periods when the main LEDs would not be drawing current also assures that the lighting device maintains a higher input power factor during operation.

Referring now to FIG. 1, a lighting system 100 includes an AC power source 102, a TRIAC dimmer 103 (shown as an example TRIAC dimmer circuit, though other dimmer circuits are anticipated), a bridge rectifier 104, and a circuit 110 configured to drive a plurality of LEDs 190. As shown in the figure, the circuit 110 includes circuit components for reduced flickering and a series of light emitting devices for low-voltage lighting in accordance with some embodiments. In particular, the circuit 110 includes a dimming bleeder (shown in FIG. 1 as comprising elements D2, R2, R3, R4, R5, LEDs 180, and current sink 120), a set of current sinks 140 that are used to set the current that drives the plurality of LEDs 190, a set of capacitors 160 to provide power to the plurality of LEDs 190 when the voltage of the AC source drops below the turn-on voltage threshold of the plurality of LEDs 190 and to reduce flickering of the plurality of LEDs 190, and a second set of LEDs 180 that are connected to the dimming bleeder 120 for maintaining a load on the TRIAC dimmer 103 when the voltage of the AC source drops below the turn-on voltage threshold of the plurality of LEDs 190. The circuit 110 has a power factor correction that is greater than 90% at full conduction of the TRIAC dimmer.

When an AC waveform is applied from the AC power source 102 to the TRIAC dimmer 103, the TRIAC dimmer 103 conducts current in either direction of the AC. When the TRIAC dimmer 103 is turned on (i.e., when it is triggered) at a controlled phase angle of the AC in the circuit, the TRIAC dimmer 103 allows control of the average current flowing into the bridge rectifier 104. The signal input into the bridge rectifier 104 is then rectified into a rectified AC waveform. The rectified AC waveform is then supplied to the circuit 110 and may include one or more diodes or resistors to set and maintain the current without significant effect from ripples in the rectified AC waveform. The rectified AC signal is then split to form a semi-parallel circuit between a (first) circuit branch for setting and maintaining the current in the plurality of LEDs 190, combined with circuitry which includes the set of capacitors 160 for reduced flicker in the LEDs 190 and a second circuit branch. The second circuit branch includes the current sinks 140, the dimming bleeder circuit, and LEDs 180. In addition, the circuit 110 may include one or more resistors that are connected to the one or more current sinks 140 to set the current.

As illustrated in FIG. 1, the first branch of the circuit 110 includes the capacitors 160 (typically, electrolytic or solid state capacitors) to reduce flickering of the plurality of LEDs 190. The capacitors 160 are included between the bridge rectifier 104 and the plurality of LEDs 190 to ensure that current supplied into the plurality of LEDs 190 is stable and without significant ripple from the rectified AC waveform, even when the voltage drops below the turn-off voltage for the plurality of LEDs 190. The stable current reduces flickering in the LEDs by maintaining a proper voltage across the entire plurality of LEDs 190. In some instances, a shunt resistor is connected as shown in FIG. 1 to ensure that voltage can be regulated and drawn down as necessary across the plurality of LEDs 190. This is particularly advantageous during power off conditions.

In some embodiments, the plurality of LEDs 190 may include one or more sets of LEDs 190, with each set of LEDs including one or more LEDs connected in series and/or parallel. The total number of LEDs in series may be selected so that the circuit has a suitably high efficiency when the input voltage to the string is at the maximum line voltage. Efficiency may also be increased by keeping the voltage across the selected LEDs close to an applied AC voltage.

In some embodiments, the plurality of LEDs 190 and the second set of LEDs 180 have the same color temperature or the same color. In some embodiments, the plurality of LEDs 190 and the second set of LEDs 180 have different color temperatures. In other embodiments, the plurality of LEDs 190 and the second set of LEDs 180 have different colors. Depending on the type of the plurality of LEDs 190 and the second set of LEDs 180, an additional circuit may be included to accommodate these devices for proper operation.

In some embodiments, the combination of the plurality of LEDs 190 and the second set of LEDs 180 is used to provide an adjustable color temperature for the lighting system 100. In some embodiments, the lighting system 100 includes the plurality of LEDs 190 with a color temperature of, for example, 5000K (white/bright) and the second set of LEDs 180 with a color temperature of, for example, 2700K (warm/orange color). By combining these two different LED types or color temperatures, the lighting system 100 can be configured to produce a desired color temperature by adjusting the proportion of light coming from each of the plurality of LEDs 190 and the second set of LEDs 180.

In some embodiments, the lighting system 100 can be created to reproduce a lower color temperature (i.e., color drifting toward the yellow/orange/red side of the color spectrum) similar to an incandescent bulb effect at dim (or low brightness) levels and transition into more of a natural light (higher color temperature) color at full brightness. This can be done if the second set of LEDs 180 has a lower turn-on voltage and the dimming bleeder 120 is set to a low brightness to provide a low voltage so that only the second set of LEDs, which have a color temperature of, for example, 2700K, are turned on at the low voltage. As the TRIAC conduction angle is increased, the peak voltage from the AC source is increased on the circuit 100, resulting in a higher range of the AC voltage supplied to activate or turn-on the plurality of LEDs 190, which have a higher color temperature of, for example, 5000K. By adjusting the dimming bleeder current value by controlling bleeder current sink 120 (for example, via an included knob or slide), the color temperature of the lighting system 100 can be set from a warm dim color to a bright natural light color. In some embodiments, the lighting system 100 can be configured to have the opposite effect of having a higher color temperature at low voltage and a cooler color temperature at high voltage by setting the dimming bleeder 120 accordingly.

Circuit 110 includes the current sinks 140 and the dimming bleeder 120. This branch of the circuit 110 is included to set the current that is to be supplied to the plurality of LEDs 190. The current sinks 140 provide a constant current through the plurality of LEDs 190 regardless of what the voltage is across the plurality of LEDs 190 once the applied AC waveform is above the turn on voltage of the main LEDs 190. The resistors attached to the current sinks 140 are used to set the magnitude of current for each current sink 140 in order to create a variable resistive load. In doing so, the current sinks 140 augment the overall resistance of the circuit to maintain constant current through the plurality of LEDs 190, even as the voltage fluctuates in the AC waveform. Although shown as 120V/60 Hz AC waveform in FIG. 1, the rectified AC waveform rises and falls at 120 Hz due to rectification. It should be noted that the AC source waveform can be at another voltage or frequency, for example, 220 V/50 Hz for European circuits, or any other voltage and frequency deemed appropriate for the geographic location or specific application.

Similarly, one or more resistors are connected to the dimming bleeder current sink 120 to appropriately set the bleeder current via the current sink circuit. In some instances, for example as shown in FIG. 1, instead of using a purely resistive load to draw bleeder current, the dimming bleeder current sink 120 is connected to the second set of LEDs 180 to utilize the "wasted" bleeder current to generate light in the second set of LEDs 180 and improve the efficiency of the overall circuit. The dimming bleeder current sink 120 is used in combination with the second set of LEDs to maintain a load on the TRIAC dimmer 103 when the voltage of the AC source is below the turn-on voltage threshold of the plurality of LEDs 190. Additionally, a capacitor is added across the second set of LEDs 180 to reduce the flicker of the second set of LEDs 180.

In one embodiment the current setting is enabled by embedded integrated circuits, shown as boxes U1, U2, U3, and U4 in FIG. 1. Each of the integrated circuits shown in FIG. 1 (including U1, the dimming bleeder current sink 120 and U2, U3, and U4, included in each of the current sinks 140), are similar or substantially similar to the integrated circuit shown and described later with respect to FIG. 4. While integrated circuits are generally shown and described throughout the specification, it will be appreciated by those skilled in the art that the disclosure is not limited to such configurations; it is anticipated that the same functionality may be accomplished via discrete components.

Referring now to FIG. 2, a lighting system 200 includes an AC power source 202, a TRIAC dimmer 203 (TRIAC circuit represented as a box 203), a bridge rectifier 204, and a circuit 210 configured to drive a plurality of LEDs 290. As shown in the figure, the circuit 210 includes circuit components for reduced flicker and a series of light emitting devices for low-voltage lighting in accordance with some embodiments. In particular, the circuit 210 includes a dimming bleeder, consisting of a bleeder current sink 220 and a set of resistors R2, R3, R4 and R5, a set of current sinks 240 that are used to set the current that drives the plurality of LEDs 290, a set of capacitors 260 to provide power to the plurality of LEDs 290 when the voltage of the AC source drops below the turn-on voltage threshold of the plurality of LEDs 290 to reduce flicker in the plurality of LEDs 290, and a second set of LEDs 280 that are connected to the dimming bleeder current sink 220 and other bleeder circuitry for maintaining a load on the TRIAC dimmer 203 when the voltage of the AC source is below the forward (turn-on) voltage threshold of the plurality of LEDs 290.

The lighting system 200 is substantially similar to the lighting system 100 as shown in FIG. 1, except for the higher lumens afforded by the inclusion of additional LEDs 290 and the addition of more current sinks 240 added to the current sink circuit for added current draw through LEDs 290. Accordingly, the circuit 210 includes additional capacitors 260 to reduce flicker in the additional LEDs 290. The current setting is enabled by embedded integrated circuits, shown as boxes U1, U2, U3, U4, and U5 in FIG. 2. Each of the components represented by a "U" designation, including U1, U2, U3, U4, and U5, are similar or substantially similar to the integrated circuits shown in FIG. 1 and described later with respect to FIG. 4.

Referring now to FIG. 3, a lighting system 300 includes an AC power source 302, a TRIAC dimmer 303 (the TRIAC circuit represented as a box), a bridge rectifier 304, and a circuit 310 configured to drive a plurality of LEDs 390. As shown in the figure, the circuit 310 includes circuit components for reduced flicker and a series of light emitting devices for low-voltage lighting in accordance with some embodiments. In particular, the circuit 310 includes a dimming bleeder consisting of the bleeder current sink 320 in combination with R2, R3, R4 and R5, a set of current sinks 340 that are used to set the current that drives the plurality of LEDs 390, a set of capacitors 360 to provide power to the plurality of LEDs 390 when the voltage of the AC source is below the turn-on voltage threshold of the plurality of LEDs 390 to reduce flicker in the plurality of LEDs 390, and a second set of LEDs 380 that are connected to the dimming bleeder current sink 320 and other bleeder circuitry for maintaining a load on the TRIAC dimmer 303 when the voltage of the AC source drops below the forward (turn-on) voltage threshold of the plurality of LEDs 390.

The lighting system 300 is substantially similar to the lighting system 100 as shown in FIG. 1 and the lighting system 200 as shown in FIG. 2, except for even higher lumens afforded by the inclusion of additional LEDs 390 and additional current sink circuits to pull more current through LEDs 390. Accordingly, the circuit 310 includes additional capacitance 360 to reduce flicker in the LEDs 390.

The current setting is enabled by embedded integrated circuits, shown as components represented by a "U" designation, including U1, which is included in the dimming bleeder 320, and U2, U3, U4, and U5, which are included the current sinks 340. The integrated circuits shown are similar or substantially similar to the integrated circuits shown in FIG. 1 and described later with respect to FIG. 4.

Figure 4:
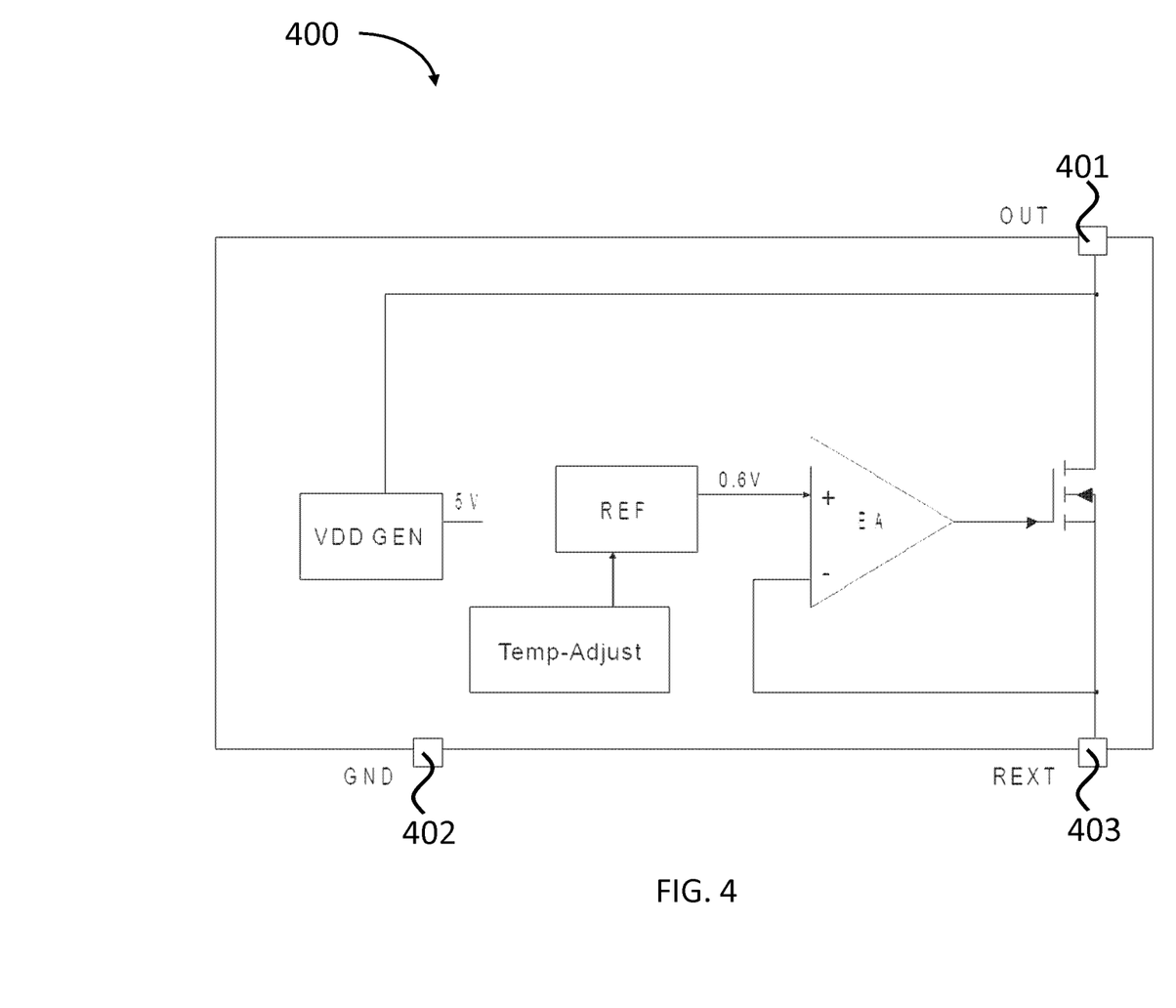
FIG. 4 is a schematic circuit diagram of an example integrated circuit (IC) used in the circuits shown in FIGS. 1-3.

Referring now to FIG. 4, an integrated circuit 400 is illustrated with various functional components. Denoted as either U1, U2, U3, U4, U5, or U6 in each of the FIGS. 1-3, the integrated circuit 400 includes a standard current sink with an Out connection 401, a circuit Ground connection 402 and a current setting Rext connection 403.

Figure 5:
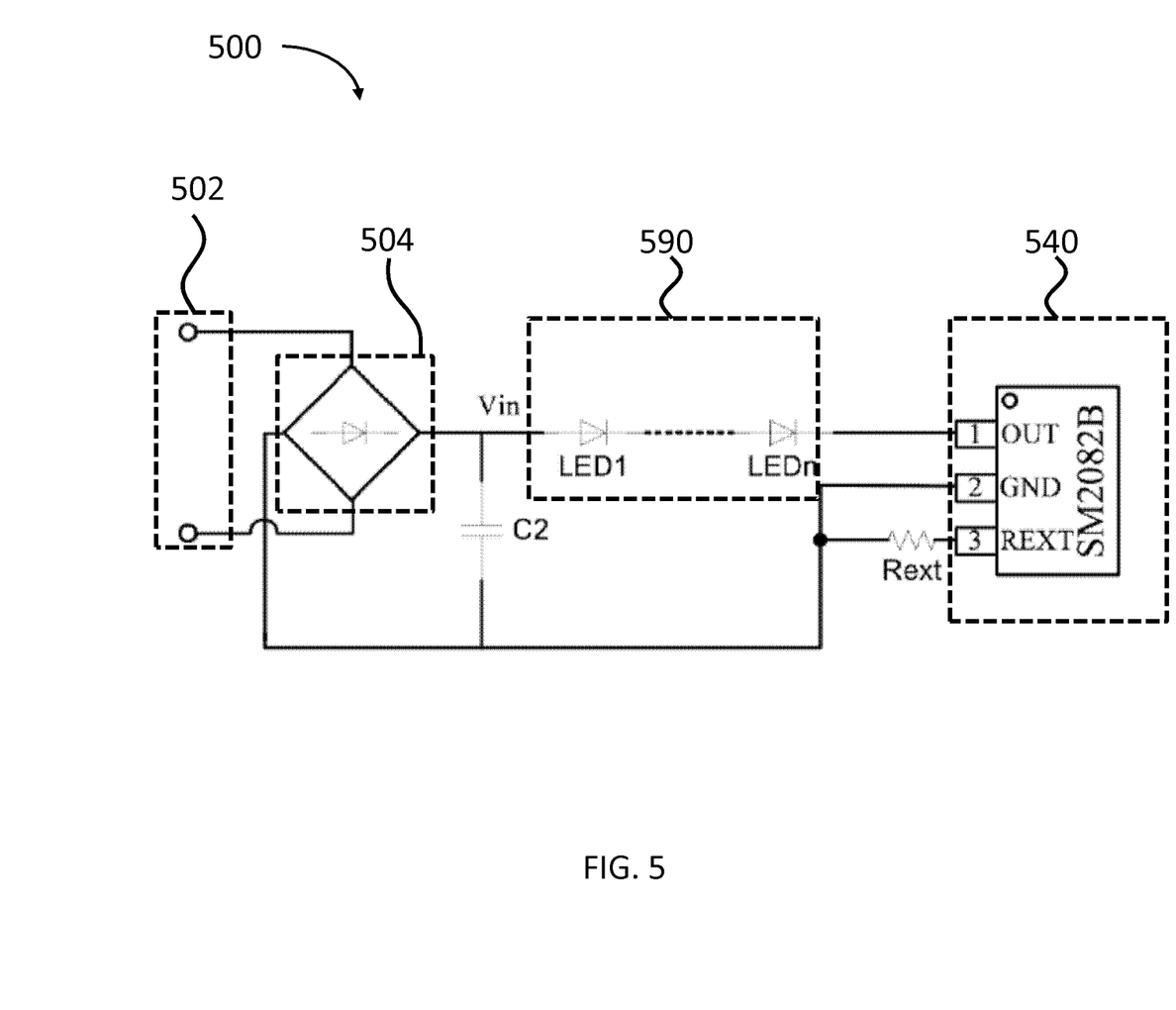
FIG. 5 is a schematic circuit diagram of an AC lighting system without dimming capability.

FIG. 5 is an illustration of an example simplified circuit for AC driving without dimming capability. As illustrated in FIG. 5, a lighting system 500 includes an AC power source 502, a bridge rectifier 504, and a current sink 540 configured to set a current to drive a plurality of LEDs 590 in series configuration. As in FIGS. 1-3, higher lumen levels can be achieved through additional LEDs 590 and additional current sink circuits 540. Unlike FIGS. 1-3, the lighting system 500 does not include circuit components for reduced flicker, does not include a standard TRIAC wall dimmer, or a dimmer bleeder for providing holding current to a TRIAC.

When an AC waveform is applied from the AC power source 502 to the bridge rectifier 504, the signal output of the bridge rectifier 504 is a rectified AC waveform. The rectified AC waveform is then supplied to the current sink 540, which includes an integrated circuit that is used to set the current through the plurality of LEDs 590. The magnitude of the current sink level is set via the Rext connection. In this circuit, the capacitor C2 is used to reduce flicker in the plurality of LEDs 590.

Figure 6:
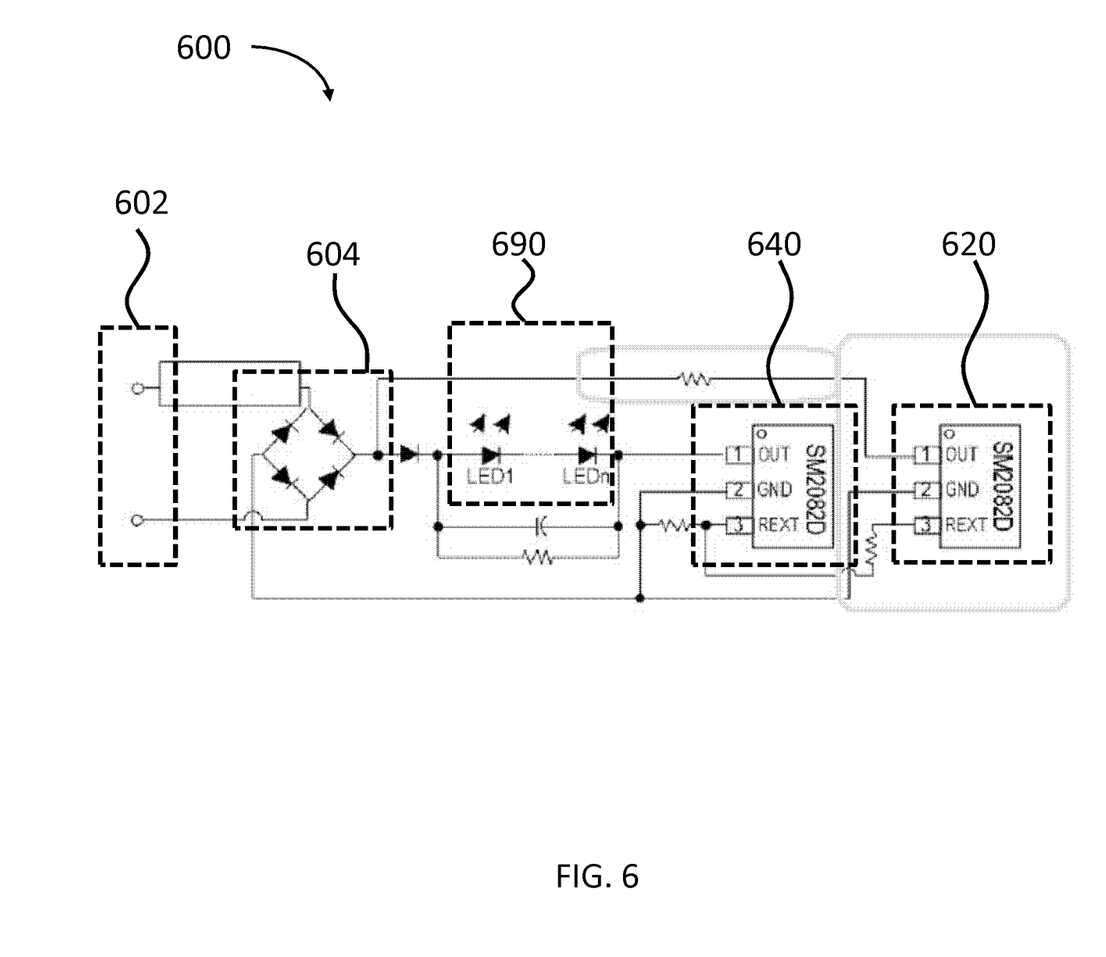
FIG. 6 is a schematic circuit diagram of a lighting system with TRIAC dimming capability.

Referring now to FIG. 6, a simplified circuit for AC driving using a TRIAC dimmer is illustrated. As shown, a lighting system 600 includes an AC power source 602, a bridge rectifier 604, a dimming bleeder current sink 620, and a current sink 640 configured to set a current to drive a plurality of LEDs 690 in series configuration. In this circuit, one or more resistors is connected to the dimming bleeder current sink 620 for maintaining a load on a connected TRIAC dimmer (not shown) when the voltage of the AC source is below the forward (turn-on) voltage threshold of the plurality of LEDs 690. However, unlike the lighting systems shown in FIGS. 1-3, the lighting system 600 does not include circuit components for reduced flicker and does not include a series of light emitting devices with low forward (turn-on) voltage for recovering wasted power in the bleeder circuit.

When an AC waveform is applied from the AC power source 602 to the bridge rectifier 604, the signal output of the bridge rectifier 604 is a rectified AC waveform. The rectified AC waveform is then supplied to the current sink 640, which includes an integrated circuit that is used to set the current through the plurality of LEDs 690, the level of which is set via the Rext connection. Current sink 640 is used to set the current to be supplied to the plurality of LEDs 690.

According to some embodiments, the lighting system includes a first plurality of light emitting diodes (also referred to herein as "primary" LEDs), a circuit for receiving an AC waveform from a TRIAC dimmer and generating a rectified AC waveform. The circuit includes one or more current sinks, a bridge rectifier connected to the one or more current sinks, a bleeder circuit, and a second plurality of LEDs (also referred to herein as "secondary" or "low-voltage" LEDs), connected to the bleeder circuit. The low-voltage LEDs have a lower forward (turn-on) voltage compared to the primary LEDs, which have a higher forward (turn-on) voltage. In some embodiments, the bleeder circuit maintains a load on the TRIAC dimmer when an output voltage from the bridge rectifier drops below a voltage to turn on one or more of the first plurality of LEDs. In some embodiments, the load comprises the second plurality of LEDs.

In some embodiments, the circuit further includes one or more capacitors for reducing flicker of one or more of the first plurality of LEDs. In some embodiments, one or more of the first plurality of LEDs have a color temperature different than one or more of the second plurality of LEDs. In some embodiments, one or more of the first plurality of LEDs is turned off and one or more of the second plurality of LEDs is turned on to provide a first color temperature corresponding substantially to a color temperature of the one or more of the second plurality of LEDs. In some embodiments, one or more of the first plurality of LEDs and one or more of the second plurality of LEDs are turned on to provide a second color temperature corresponding substantially to a color temperature of the one or more of the first plurality of LEDs. In some embodiments, the circuit further includes one or more capacitors for reducing flicker in one or more of the second plurality of LEDs. In some embodiments, the one or more current sinks include an integrated circuit for setting a stable current. In some embodiments, the AC waveform input voltage may be between 0 V and 240 V.

According to some embodiments, the circuit for solid state lighting apparatus includes an AC power source, a first plurality of light emitting diodes (also referred to herein as "primary" or "main" LEDs), a bridge rectifier for providing a rectified AC waveform, and at least one capacitor for reducing flicker in the LEDs. In some embodiments, the circuit further includes one or more current sinks connected to the bridge rectifier, wherein the current sinks establish the current through the LEDs when the AC waveform voltage is above the turn on voltage of the LEDs. In some embodiments, the circuit further includes a dimming bleeder, and a second plurality of LEDs (also referred to herein as "secondary" or "low-voltage" LEDs), connected in series to the dimming bleeder current sink. In some embodiments, the first plurality of LEDs have a first color temperature and the second plurality of LEDs have a second color temperature that is different from the first color temperature. In some embodiments, the first plurality LEDs have a first color and the second plurality of LEDs have a second color that is different from the first color. In some embodiments, the first plurality of LEDs are turned off and the second plurality of LEDs are turned on to provide a color temperature substantially similar to the second color temperature. In some embodiments, the first plurality of LEDs and the second plurality of LEDs are turned on to provide a color temperature substantially similar to the first color temperature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The invention claimed is:

1. A circuit for solid state lighting apparatus comprising:
an AC power source;
a TRIAC dimmer;

a first plurality of light emitting diodes (LEDs);
a bridge rectifier for providing a rectified AC waveform;
at least one capacitor for reducing flicker in the LEDs;
a dimming bleeder;
a plurality of supplemental current sinks;
a plurality of resistors coupled to the plurality of supplemental current sinks to generate variable resistive load; and
a second plurality of LEDs connected in series to the dimming bleeder;
  wherein the dimming bleeder and the second plurality of LEDs maintain a load on the TRIAC dimmer when an output voltage from the bridge rectifier drops below a voltage to turn on one or more of the first plurality of LEDs, and wherein the plurality of supplemental sinks augment the overall resistance of the circuit to maintain constant current through the first plurality of LEDs.

2. The circuit of claim 1, wherein the first plurality of LEDs have a first color temperature and the second plurality of LEDs have a second color temperature that is different from the first color temperature.

3. The circuit of claim 1, wherein the first plurality LEDs have a first color and the second plurality of LEDs have a second color that is different from the first color.

4. The circuit of claim 2, wherein the first plurality of LEDs are turned off and the second plurality of LEDs are turned on to provide a color temperature substantially similar to the second color temperature.

5. The circuit of claim 2, wherein the first plurality of LEDs are turned on and the second plurality of LEDs are turned on off to provide a color temperature substantially similar to the first color temperature.

6. The circuit of claim 2, wherein the AC waveform has an input voltage between 0 V and 277 V.

* * * * *